(12) United States Patent
Wada et al.

(10) Patent No.: US 11,457,512 B2
(45) Date of Patent: Sep. 27, 2022

(54) CORD-SHAPED HEATER, SHEET-SHAPED HEATER AND MANUFACTURING METHOD OF SHEET-SHAPED HEATER

(71) Applicant: KURABE INDUSTRIAL CO., LTD., Hamamatsu (JP)

(72) Inventors: Akifumi Wada, Hamamatsu (JP); Tadao Suzuki, Hamamatsu (JP)

(73) Assignee: KURABE INDUSTRIAL CO., LTD., Hamamatsu (JP)

( * ) Notice: Subject to any disclaimer, the term of this patent is extended or adjusted under 35 U.S.C. 154(b) by 376 days.

(21) Appl. No.: 16/624,906

(22) PCT Filed: Jul. 20, 2018

(86) PCT No.: PCT/JP2018/027361
§ 371 (c)(1),
(2) Date: Dec. 20, 2019

(87) PCT Pub. No.: WO2019/021970
PCT Pub. Date: Jan. 31, 2019

(65) Prior Publication Data
US 2020/0137838 A1    Apr. 30, 2020

(30) Foreign Application Priority Data
Jul. 26, 2017  (JP) .............................. JP2017-144147

(51) Int. Cl.
*H05B 3/36*   (2006.01)
*H05B 3/10*   (2006.01)
*H05B 3/56*   (2006.01)

(52) U.S. Cl.
CPC ................. *H05B 3/36* (2013.01); *H05B 3/10* (2013.01); *H05B 3/56* (2013.01); *H05B 2203/017* (2013.01)

(58) Field of Classification Search
CPC ... H05B 3/36; H05B 3/10; H05B 3/56; H05B 3/34; H05B 3/20; H05B 2203/017; H05B 2203/029; B60N 2/5685; B62D 1/065
See application file for complete search history.

(56) References Cited

U.S. PATENT DOCUMENTS

| | | |
|---|---|---|
| 2003/0111454 A1 | 6/2003 | Ishiyama et al. |
| 2004/0094534 A1 | 5/2004 | Howick et al. |

(Continued)

FOREIGN PATENT DOCUMENTS

| | | | |
|---|---|---|---|
| DE | 202013101027 U | 5/2013 | |
| DE | 202013101027 U1 * | 5/2013 | ............... H05B 3/34 |

(Continued)

OTHER PUBLICATIONS

International Search Report for PCT/JP2018/027361 dated Sep. 11, 2018.
PCT written opinion dated Sep. 11, 2018.

*Primary Examiner* — Shawntina T Fuqua
(74) *Attorney, Agent, or Firm* — Yokoi & Co., U.S.A.; Toshiyuki Yokoi

(57) ABSTRACT

A cord-shaped heater 1, having: a conductive wires 5a; an inner-layer covering 7 formed on the outer periphery of the conductive wires 5a; and an outer-layer covering 9 formed on the outer periphery of the inner-layer covering 7, wherein the melting temperature of the inner-layer covering 7 is higher than the melting temperature of the outer-layer covering 9, the inner-layer covering 7 and the outer-layer covering 9 are made of same type of polymer material, and the inner-layer covering 7 and the outer-layer covering 9 are adhered to each other. The cord-shaped heater 1, wherein the conductive wire 5a includes a plurality of conductive wires, and the conductive wires 5a is covered with an insulating film 5b. A sheet-shaped heater, wherein the cord-shaped heater is arranged on a substrate, the substrate has a gap, at (Continued)

least a part of the outer-layer covering is penetrated into the gap of the substrate, and the inner-layer covering is not penetrated into the gap of the substrate.

14 Claims, 5 Drawing Sheets

(56) References Cited

U.S. PATENT DOCUMENTS

| | | |
|---|---|---|
| 2008/0016679 A1 | 1/2008 | Howick et al. |
| 2015/0257205 A1 | 9/2015 | Hase et al. |
| 2015/0336602 A1 | 11/2015 | Saito et al. |
| 2017/0036688 A1 | 2/2017 | Wada et al. |

FOREIGN PATENT DOCUMENTS

| | | | |
|---|---|---|---|
| JP | S61-47087 A | | 3/1986 |
| JP | 2005-322607 A | | 11/2005 |
| JP | 2006-506784 | * | 2/2006 |
| JP | 2006-506784 A | | 2/2006 |
| JP | 4118878 B | | 7/2008 |
| JP | 2008-311111 A | | 12/2008 |
| JP | 4202071 B | | 12/2008 |
| JP | 2010-15691 A | | 1/2010 |
| JP | 2014-127230 A | | 7/2014 |
| JP | 2014-143175 A | | 8/2014 |
| JP | 2014-209444 | * | 11/2014 |
| JP | 2014-209444 A | | 11/2014 |
| WO | 2011/001953 A | | 1/2011 |
| WO | 2014/103981 A | | 7/2014 |
| WO | 2017-026217 | * | 2/2017 |
| WO | 2017/026217 A | | 2/2017 |

* cited by examiner

CORD-SHAPED HEATER, SHEET-SHAPED HEATER AND MANUFACTURING METHOD OF SHEET-SHAPED HEATER

TECHNICAL FIELD

The present invention relates to a cord-shaped heater and a sheet-shaped heater using the cord-shaped heater. The cord-shaped heater and the sheet shaped heater can be suitably used for an electric blanket, an electric carpet, a car sheet heater and a steering heater, for example. In particular, the present invention related to the cord-shaped heater and the sheet-shaped heater having high adhesiveness and sufficient insulation performance.

BACKGROUND ART

In general, a cord-shaped heater used for various heaters and the like is known to be formed by spirally winding a conductive wire (i.e., resistor) around a core material and coating them with an outer cover made of an insulation layer. Here, copper wire and nickel-chromium alloy wire and the like are used for the conductive wire, and the conductive wire is formed by paralleling or twisting a plurality of conductive wires together. In the above described conductive wires, the configuration of forming insulating films on each of the conductive wires to insulate the conductive wires with each other is conventionally known.

In addition, the configuration of forming a heat-fused portion on an outer periphery of the conductive wires and an outer periphery of the insulation layer is conventionally known.

For example, a method of forming a sheet-shaped heater by arranging a cord-shaped heater on a substrate such as a nonwoven fabric, an aluminum foil and polymeric foam and heating and pressing it for heat-fusing the cord-shaped heater and the substrate with each other is conventionally known (e.g., shown in Patent Document 1 to Patent Document 8).

PRIOR ART DOCUMENTS

Patent Documents

[Patent document 1] Japanese Patent No. 4202071: KURABE INDUSTRIAL CO., LTD.
[Patent document 2] Japanese Unexamined Patent Application Publication No. S61-47087: Matsushita Electric Industrial Co., Ltd.
[Patent document 3] Japanese Unexamined Patent Application Publication No. 2008-311111: KURABE INDUSTRIAL CO., LTD.
[Patent document 4] Japanese Unexamined Patent Application Publication No. 2010-15691: KURABE INDUSTRIAL CO., LTD.
[Patent document 5] International Publication No. WO2011/001953: KURABE INDUSTRIAL CO., LTD.
[Patent document 6] International Publication No. WO2014/103981: KURABE INDUSTRIAL CO., LTD.
[Patent document 7] Japanese Unexamined Patent Application Publication No. 2014-143175: KURABE INDUSTRIAL CO., LTD.
[Patent document 8] Japanese Patent No. 4118878: W.E.T. Automotive Systems AG

DISCLOSURE OF THE INVENTION

Problems to be Solved by the Invention

The cord-shaped heater and the sheet-shaped heater described in the above Patent Documents have the following problems. First, when a heat-fusing material is directly formed on the conductive wires, the heat-fusing material may be pressed and deformed during the heating and pressing. In such a case, enough thickness required for the insulation of the conductive wires may not be obtained. When the insulating film is formed for each of the conductive wires, although necessary minimum insulation property can be maintained, the demand for enhancing the safety exist. In addition, when the insulation layer is formed on the outer periphery of the conductive wires and the heat-fusing material is formed on the outer periphery of the insulation layer, the insulation layer is not deformed and enough insulation property can be maintained. However, the adhesion between the insulation layer and the heat-fusing material is not examined at all. Thus, at a portion where the heat-fusing material is pressed and deformed during the heating and pressing, there is a risk that only the heat-fusing material remains on the substrate and the insulation layer and the conductive wires are separated from the substrate.

The present invention aims for solving the above described problem of the conventional technology. The present invention aims for providing a cord-shaped heater and a sheet-shaped heater using the cord-shaped heater having high adhesiveness and enough insulation property.

Means for Solving the Problem

For achieving the above described purposes, a cord-shaped heater of the present invention has: a conductive wire; an inner-layer covering formed on the outer periphery of the conductive wire; and an outer-layer covering formed on the outer periphery of the inner-layer covering, characterized in that the melting temperature of the inner-layer covering is higher than the melting temperature of the outer-layer covering, the inner-layer covering and the outer-layer covering are made of same type of polymer material, and the inner-layer covering and the outer-layer covering are adhered to each other.

In addition, the conductive wire can include a plurality of conductive wires, and the conductive wires can be covered with an insulating film.

A sheet-shaped heater of the present invention is characterized in that the above described cord-shaped heater is arranged on a substrate.

In addition, the substrate can have a gap, at least a part of the outer-layer covering can be penetrated into the gap of the substrate, and the inner-layer covering can be not penetrated into the gap of the substrate.

In addition, a cross-sectional shape of the inner-layer covering can be kept in an approximately circular shape.

A manufacturing method of a sheet-shaped heater of the present invention the method has the steps of: arranging a cord-shaped heater on a substrate having a gap, the cord-shaped heater including a conductive wire, an inner-layer covering formed on the outer periphery of the conductive wire, and an outer-layer covering formed on the outer periphery of the inner-layer covering; and heat-fusing the cord-shaped heater and the substrate by melting the outer-layer covering by heat and pressure without substantially melting the inner-layer covering so that the outer-layer covering is penetrated into the gap of the substrate.

Effects of the Invention

In the cord-shaped heater of the present invention, since the melting temperature of the inner-layer covering is higher than the melting temperature of the outer-layer covering, the inner-layer covering is not substantially deformed when the outer-layer covering is heat-fused by the heating and pressing or the like. Thus, enough insulation property can be maintained. In addition, the outer-layer covering is heat-fused with the substrate after the outer-layer covering is melted sufficiently, and the inner-layer covering and the outer-layer covering are adhered with each other sufficiently since they are made of same type of material. Thus, the cord-shaped heater or a part of the cord-shaped heater can be prevented from being separated from the substrate.

MODES FOR CARRYING OUT THE INVENTION

Figure 1:
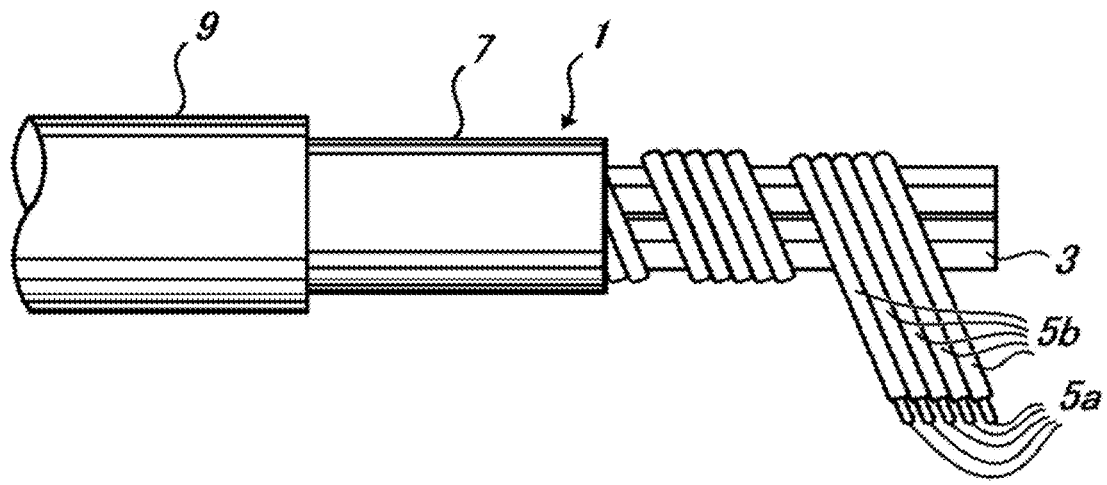
FIG. 1 is a drawing showing an embodiment of the present invention, and is a partially cutaway side view showing a configuration of a cord-shaped heater.

Hereafter, the embodiments of the present invention will be explained with reference to the drawings. In these embodiments, the present invention is used as a sheet-shaped heater and the sheet-shaped heater is assumed to be applied to a steering heater of the vehicle, as an example.

First, the present embodiment will be explained referring to FIGS. 1 to 5. A configuration of a cord-shaped heater 1 in the present embodiment will be explained. The cord-shaped heater 1 in the present embodiment has a configuration shown in FIG. 1. A core material 3 formed of an aromatic polyamide fiber bundle having an external diameter of approximately 0.2 mm is provided. Five conductive wires 5a, which are formed of a tin-containing hard copper alloy wire having a strand diameter of approximately 0.08 mm, are spirally wound at a pitch of about 1.0 mm around an outer periphery of the core material 3 in a state of being paralleled together. On the conductive wires 5a, an insulating film 5b containing a silicone is formed with a thickness of approximately 5 µm by applying an alkyd silicone varnish (alkyd:silicone=50:50) and drying it. The conductive wires 5a is wound around the core material 3 and then a polyester resin having the melting temperature of 225° C. is extruded and covered with a thickness of 0.065 mm on an outer periphery of the wound conductive wires 5a as an inner-layer covering 7. A poly ester resin having the melting temperature of 163° C. is extruded and covered with a thickness of 0.065 mm on an outer periphery of the inner-layer covering 7 as an outer-layer covering 9. The cord-shaped heater 1 has a configuration described above and has a finished outer diameter of 0.63 mm. Although the above described core material 3 is effective when bendability and tensile strength is considered, a plurality of conductive wires can be used in a state of being paralleled together or twisted without using the core material 3.

Next, a configuration of a substrate 11 to which the above described cord-shaped heater 1 is adhered and fixed will be explained. The substrate 11 of the present embodiment is formed of foamed polyurethane resin having an apparent density of 0.03 g/cm$^3$ (in accordance with JIS K7222), a hardness of 11.77 (in accordance with JIS K6400-2) and a thickness of 4 mm. The substrate 11 described above is formed in a desired shape by using conventional methods such as die cutting.

Figure 4:
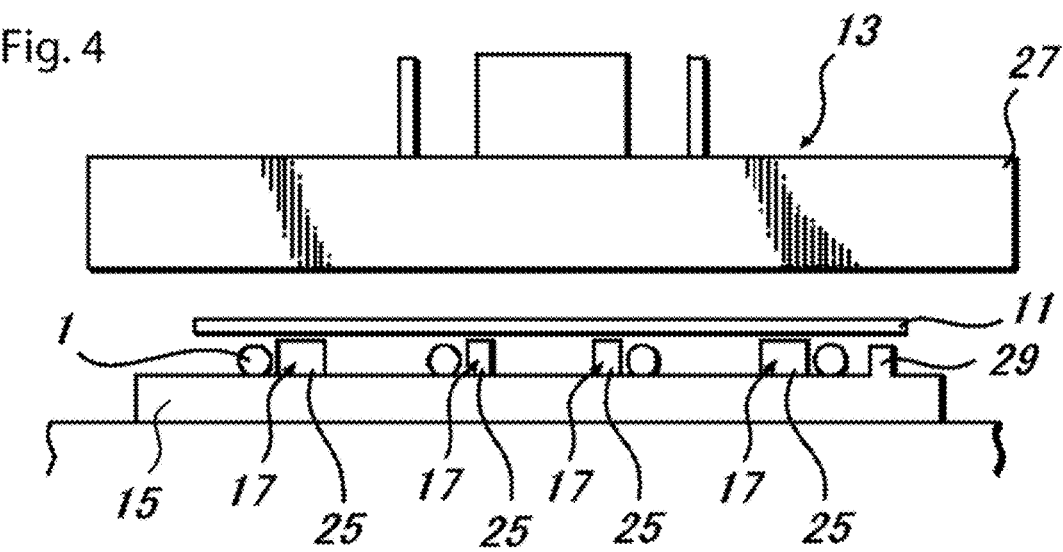
FIG. 4 is a drawing showing an embodiment of the present invention, and is a drawing showing a configuration of a hot press-type heater manufacturing apparatus.
Figure 5:
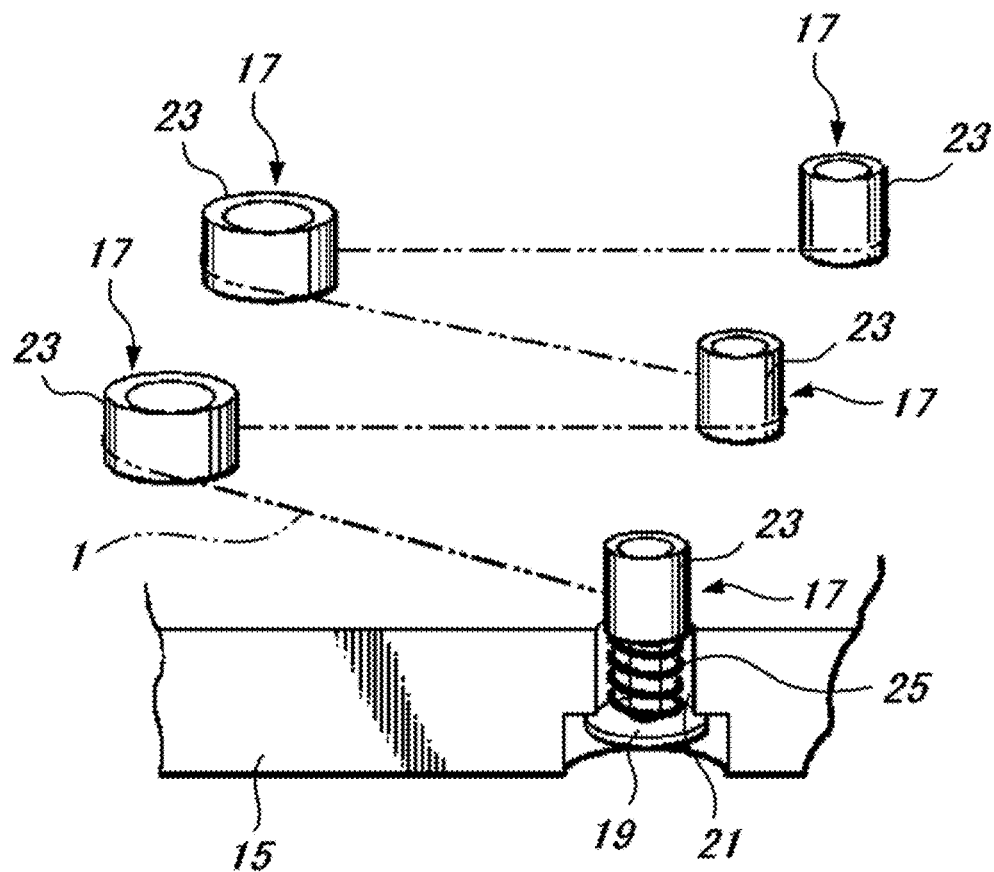
FIG. 5 is a drawing showing an embodiment of the present invention, and is a partial perspective view showing a state that the cord-shaped heater is arranged in a predetermined pattern.

Next, a configuration of arranging the cord-shaped heater 1 on the substrate 11 in a predetermined pattern shape, bonding and fixing them with each other will be explained. FIG. 4 is a drawing showing a configuration of a hot press-type heater manufacturing apparatus 13 for heating and pressing the substrate on which the cord-shaped heater 1 is arranged. A hot pressing jig 15 is prepared and a plurality of hooking mechanisms 17 is provided on the hot pressing jig 15. As shown in FIG. 5, the hooking mechanisms 17 have pins 19. The pins 19 are inserted from below into holes 21 bored on the hot pressing jig 15. Hooking members 23 having a needle shape at the tip are mounted on an upper part of the pins 19 movably in an axial direction. The hooking members 23 are always biased upward by coil springs 25. As shown by a virtual line in FIG. 5, the cord-shaped heater 1 is arranged on the substrate 11 of one side in a predetermined pattern shape by hooking the cord-shaped heater 1 on a plurality of the hooking members 23 of a plurality of the hooking mechanisms 17.

As shown in FIG. 4, a press hot plate 27 is arranged above the plurality of hooking mechanisms 17 so as to be raised and lowered. In other words, the cord-shaped heater 1 is arranged in a predetermined pattern shape by hooking the cord-shaped heater 1 on a plurality of the hooking members 23 of the hooking mechanisms 17, and then the substrate 11 is placed on that. In that state, the press hot plate 27 is lowered so as to heat and press the cord-shaped heater 1 and the substrate 11. When the press hot plate 27 is lowered, it is necessary to specify the amount of compression of the substrate 11 to be larger than the outer diameter of the cord-shaped heater 1. Because of this, the substrate 11 is compressed and a heat fusion layer 9 of the cord-shaped heater 1 is fused. Thus, the cord-shaped heater 1 and the substrate 11 are bonded and fixed with each other. Note that, when the press hot plate 27 is lowered for heating and pressing, a plurality of hooking members 23 of the hooking mechanisms 17 is moved downward against the biasing force of the coil springs 25. In the present embodiment, after the above described process, the substrate 11 is reversed and the heating and pressing are further performed by the press hot plate from the surface on which the cord-shaped heater 1 is arranged.

Figure 2:
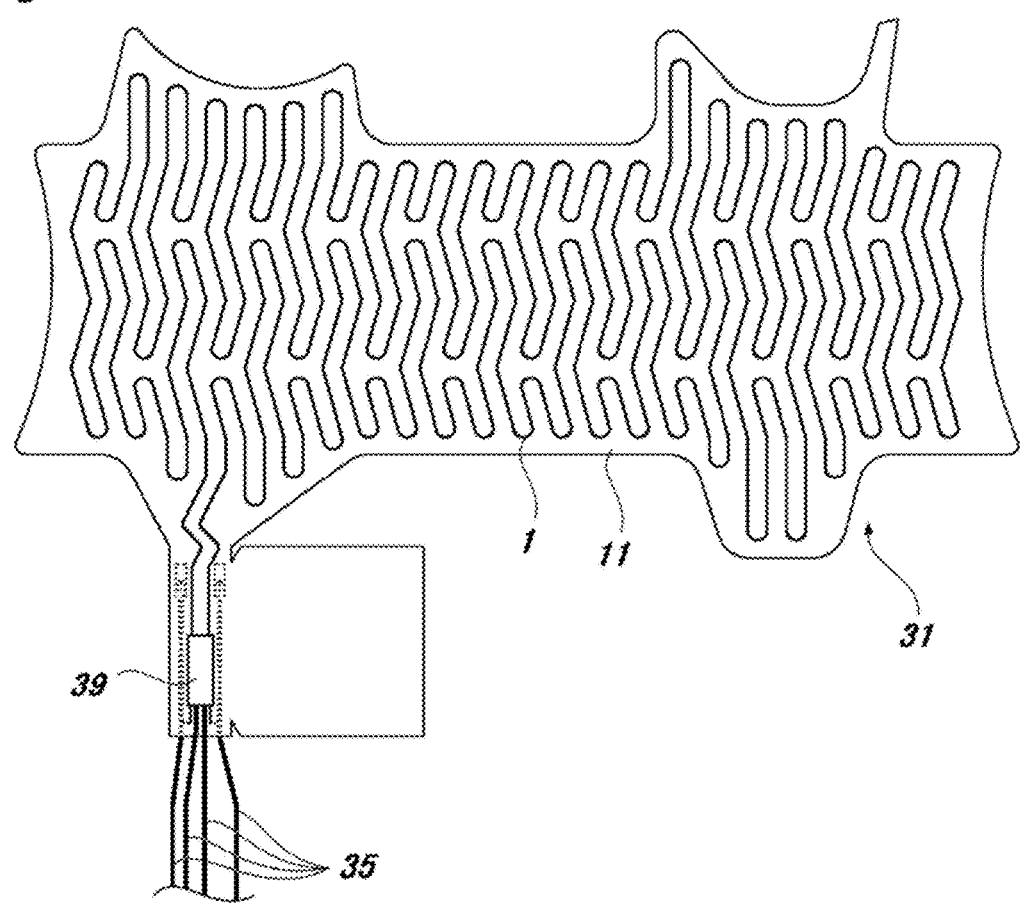
FIG. 2 is a drawing showing an embodiment of the present invention, and is a plan view showing a configuration of a sheet-shaped heater.
Figure 3:
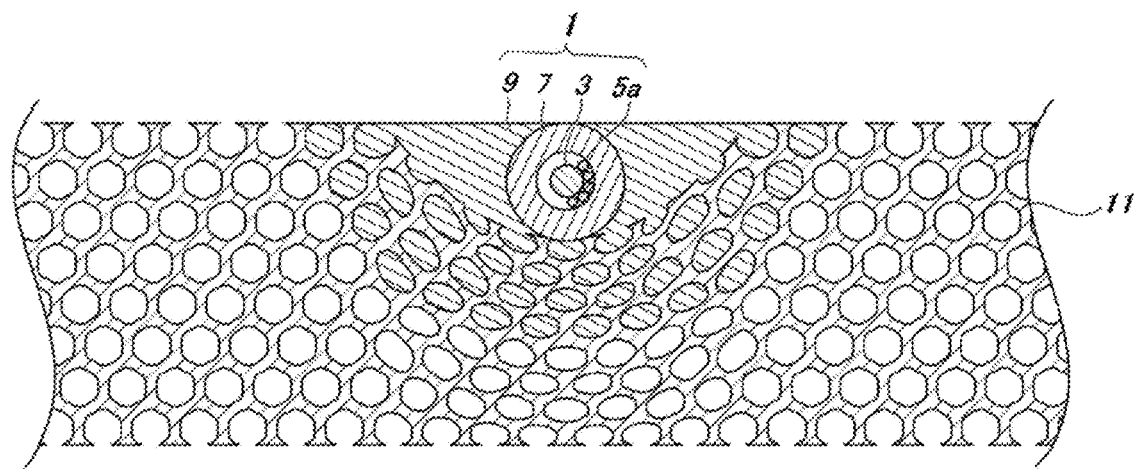
FIG. 3 is a drawing showing an embodiment of the present invention, and is a cross-sectional view showing a main part of the sheet-shaped heater in an enlarged state.

By the above described procedures, a sheet-shaped heater 31 shown in FIGS. 2 and 3 can be obtained. FIG. 3 is a cross-sectional view showing a main part of FIG. 2 in an enlarged state. Since the substrate 11 is compressed by the press hot plate 27 having a flat plate shape, the portion on which the cord-shaped heater 1 is arranged is compressed more strongly. Thus, the portion on which the cord-shaped heater 1 is arranged in the substrate 11 has a shape formed along the shape of the cord-shaped heater 1, and has a higher density and a thinner thickness compared to the other portions. Consequently, the sheet-shaped heater 31 has a flat shape without having an unevenness even at the portion on which the cord-shaped heater 1 is arranged. In addition, in the sheet-shaped heater 31 obtained by the above described method, since the substrate 11 is compressed and the density is increased, the mechanical strength can be increased. In the sheet-shaped heater 31 of the present embodiment obtained by the above described method, the thickness was 1.00 mm, the minimum thickness of the substrate 11 was 0.50 mm at the portion on which the cord-shaped heater 1 was arranged, and the thickness of the substrate 11 was 1.00 mm at the portion on which the cord-shaped heater 1 was not arranged.

Note that the outer-layer covering 9 of the cord-shaped heater 1 was deformed and fluidized by the heating and pressing and a part of the outer-layer covering 9 entered into gaps (pores) of the substrate 11. In addition, the inner-layer covering 7 of the cord-shaped heater 1 was not substantially deformed and did not enter into the gaps (pores) of the substrate 11 even when the heating and pressing were performed. Thus, a cross-sectional shape of the inner-layer covering 7 is kept in an approximately circular shape.

In the sheet-shaped heater 31 of the present embodiment obtained by the above described method, both ends of the cord-shaped heater 1 are drawn and connected to a lead wire 35. The cord-shaped heater 1, a temperature controller 39 and a connector (not illustrated) are connected with each other by the lead wire 35. The temperature controller is arranged on the cord-shaped heater 1 to control the temperature of the sheet-shaped heater by the heat generation of the cord-shaped heater 1. The cord-shaped heater 1 is connected to a not illustrated electric system of the vehicle via the above described connector. The sheet-shaped heater 31 configured as described above is installed on a steering wheel 71 in a state shown in FIG. 10. The steering wheel 71 is formed by a wheel portion 72, a spoke portion 73 and a boss portion 74. The sheet-shaped heater 31 is installed between a wheel core material 77 and a covering material 78 of the wheel portion 72.

Figure 10:
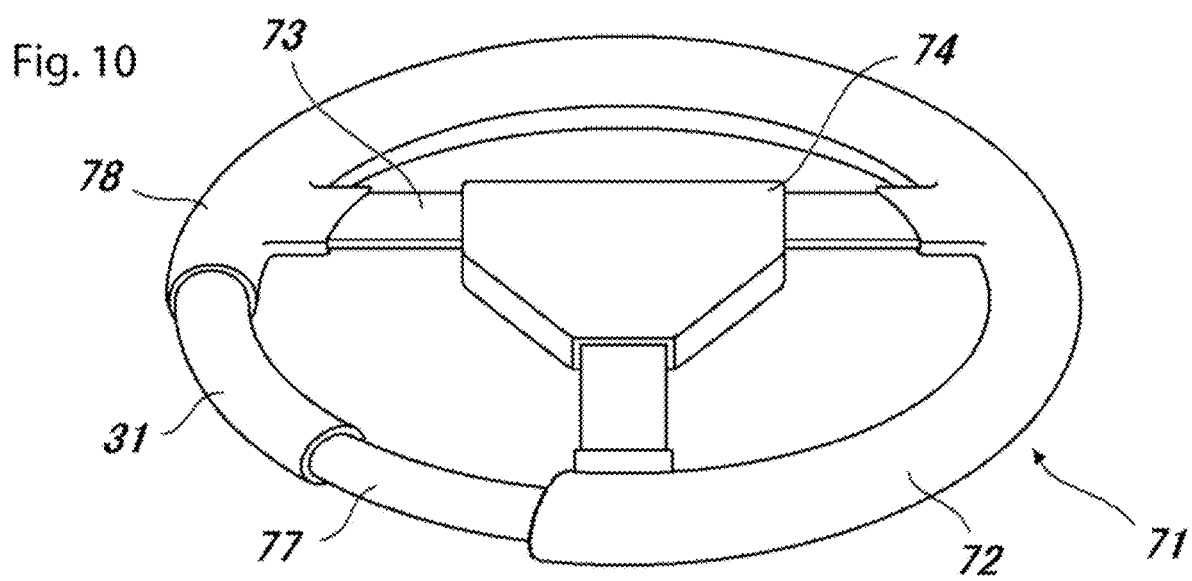
FIG. 10 is a partially cutaway perspective view showing a state that the sheet-shaped heater of the present invention is embedded in a steering wheel.

An adhesive layer (not illustrated) is formed on the substrate 11 for adhering the sheet-shaped heater 31 with the covering material 78 of the steering wheel. It is preferred that the adhesive layer is formed by preliminarily forming an adhesive layer only made of an adhesive material on a release sheet or the like and then transferring the adhesive layer from the release sheet to a surface of the substrate 11. Because of this, the adhesive material does not enter into the inside of the substrate 11 and the adhesive layer is formed only on the surface of the substrate 11. When the sheet-shaped heater 31 and the covering material 78 are adhered with each other in the embodiment 3, it is preferred to adhere the covering material 78 with the side on which the cord-shaped heater 1 is not arranged than to adhere the covering material 78 with the side on which the cord-shaped heater 1 is arranged. This is because the unevenness of the cord-shaped heater 1 hardly appears on the surface of the covering material 78. On the other hand, it is also possible to adhere the covering material 78 with the side on which the cord-shaped heater 1 is arranged when thermal efficiency is emphasized The sheet-shaped heater 31 of the present embodiment obtained by the above described method was actually used in a state of being assembled into the steering wheel as shown in FIG. 10 to check a feeling of strangeness. Regarding the check, ten users grasped the steering wheel and steered the steering wheel ten times each to the left and right. Then, whether or not the unevenness of the cord-shaped heater 1 was felt was interviewed. As a result, no user answered to feel the unevenness regarding the product of the present embodiment.

In addition, adhesion strength between the cord-shaped heater 1 and the substrate 11 was measured. As for the measurement method of the adhesion strength, the cord-shaped heater 1 was fixed by a push-pull gauge, the cord-shaped heater 1 was pulled in the direction of 180° with respect to the arrangement direction of the cord-shaped heater 1, and a load required for peeling the cord-shaped heater 1 from the substrate 11 was measured. Thus, the evaluation was carried out. In addition, insulation performance of the sheet-shaped heater 31 was measured. As for the measurement method of the insulation performance, the sheet-shaped heater 31 was set between conductive plates, a voltage was applied between the conductive plates and the cord-shaped heater 1 with a voltage elevation rate of 2000 V/min, and a breakdown voltage is determined when the current leaked 10 mA or more. Thus, the evaluation was carried out. In addition, the same measurements were carried out for a comparative embodiment where the outer-layer covering 9 was twice as thick as the present embodiment without using the inner-layer covering 7. The measurement results were shown in Table 1.

TABLE 1

|  | Present embodiment | Comparative embodiment |
| --- | --- | --- |
| Adhesion strength | 0.63 kgf | 0.64 kgf |
| Insulation performance | >2000 V | 300 V |

As also shown in Table 1, the sheet-shaped heater of the present embodiment had an excellent adhesiveness and enough insulation property. On the other hand, as for the sheet-shaped heater of the comparative embodiment 1, although the adhesiveness was excellent, the insulation property was inferior to the present embodiment while the value of the insulation property was a level capable of being practically used without problem.

Figure 8:
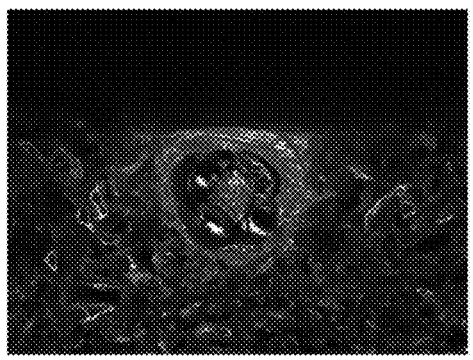
FIG. 8 is a microscope photograph showing a cross-section of the sheet-shaped heater of an embodiment of the present invention.
Figure 9:
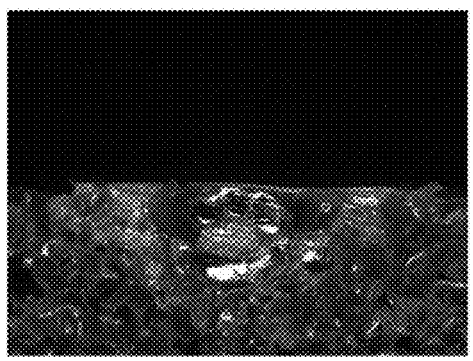
FIG. 9 is a microscope photograph showing a cross-section of the sheet-shaped heater of a comparative embodiment of the present invention.

FIG. 8 shows a microscope photograph (enlarged 175 times) of a main part in a cross-section of the sheet-shaped heater of the present embodiment. FIG. 9 shows a microscope photograph (enlarged 175 times) of a main part in a cross-section of the sheet-shaped heater of the comparative embodiment. As for the sheet-shaped heater of the present embodiment, the inner-layer covering was approximately circular and the conductive wires were kept to be covered with the inner-layer covering. Thus, it is expected that the sheet-shaped heater of the present embodiment has enough insulation property. On the other hand, as for the sheet-shaped heater of the comparative embodiment, the conductive wires were almost exposed. Although the minimum insulation property was kept since the insulating film was formed on the conductive wires, the insulation property should be increased for enhancing safety. In both the present embodiment and the comparative embodiment, it was confirmed that the outer-layer covering entered into the gaps of the substrate and the substrate and the cord-shaped heater were tightly fixed with each other by heat fusion and anchor effect.

Figure 6:
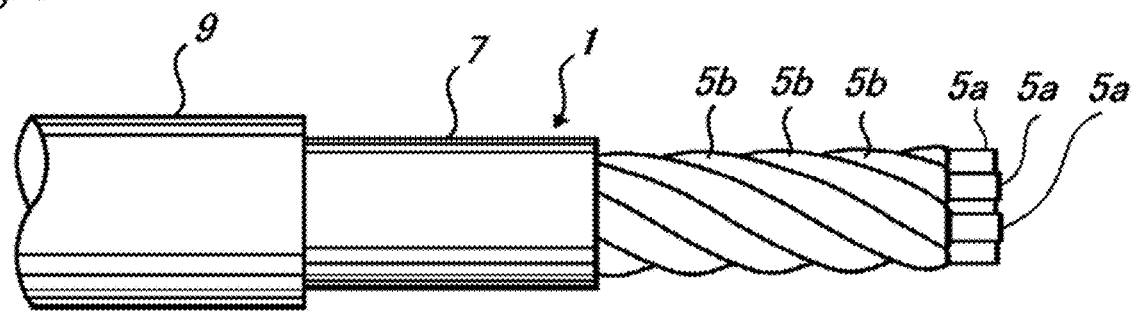
FIG. 6 is a drawing showing another embodiment of the present invention, and is a partially cutaway side view showing a configuration of the cord-shaped heater.
Figure 7:
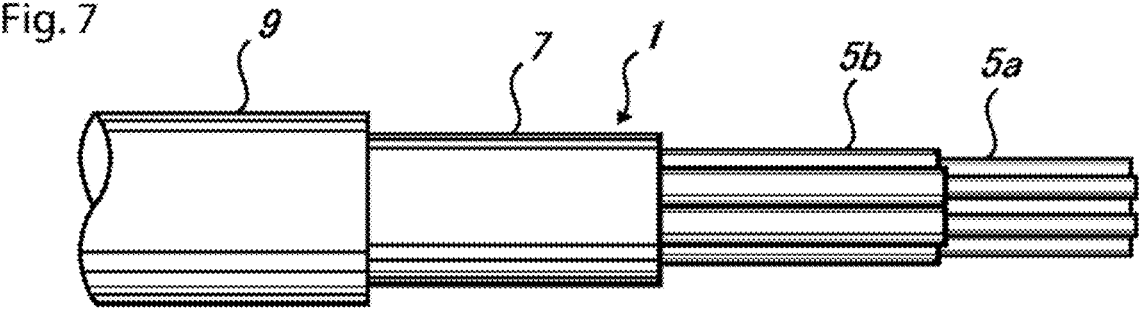
FIG. 7 is a drawing showing another embodiment of the present invention, and is a partially cutaway side view showing a configuration of the cord-shaped heater.

Note that the present invention is not limited to the above described embodiment. Regarding the configuration of the cord-shaped heater 1, as an example, the cord-shaped heater 1 can be formed by twisting or paralleling a plurality of conductive wires 5a covered with the insulating film 5b together, winding the twisted or paralleled conductive wires 5a around the core material 3, and forming the inner-layer covering 7 and the outer-layer covering 9 around an outer periphery of the wound conductive wires 5a as described in the above described embodiment (shown in FIG. 1). As another example, the cord-shaped heater 1 can be formed by twisting a plurality of conductive wires 5a covered with the insulating film 5b together without using the core material 3 (shown in FIG. 6). As another example, the cord-shaped heater 1 can be formed by paralleling a plurality of conductive wires 5a covered with the insulating film 5b together (shown in FIG. 7).

It is also possible not to form the insulating film 5b on the conductive wires 5a. For example, the embodiment where the insulating film 5b is not formed on all of the conductive wires 5a, the embodiment where the conductive wires 5a covered with the insulating film 5b and the conductive wires 5a not covered with the insulating film 5b are alternatively arranged, and the embodiment where only some of the conductive wires 5a are covered with the insulating film 5b are possible. Various configurations other than the above described examples are also possible. In addition, the core material 3 and the conductive wires 5a can be twisted together.

As the core material 3, as an example, a fiber formed by covering a thermoplastic polymer material around a core material described below can be used. The core material can be a monofilament, a multifilament or a spun of inorganic fibers such as a glass fiber or organic fibers such as a polyester fiber (e.g. polyethylene terephthalate), an aliphatic polyamide fiber, an aromatic polyamide fiber and a wholly aromatic polyester fiber. The core material can also be a fiber material of the above described fibers or an organic polymer material constituting the fiber material. If the core material 3 having a heat-shrinkable property and a heat-melting property is used, even when the conductive wires 5a is disconnected, the core material is melted, cut and simultaneously shrunk by the overheat, the wound conductive wires 5a also follow the function of the core material 3. Thus, both ends of the disconnected conductive wires 5a are separated with each other. Therefore, the ends of the disconnected conductive wires are prevented from being repeatedly contacted and separated with each other, and prevented from being contacted by a small contact area such as a point contact. Thus, the overheating can be prevented. If the conductive wires 5a are insulated by the insulating film 5b, there is no need to carefully select the insulating material of the core material 3. For example, a stainless steel wire or a titanium alloy wire can be used. However, considering the situation that the conductive wires 5a are disconnected, the core material 3 is preferred to be the insulating material.

Regarding the conductive wires 5a, conventionally known materials can be used. For example, a copper wire, a copper alloy wire, a nickel wire, an iron wire, an aluminum wire, a nickel-chromium alloy wire and an iron-chromium alloy wire can be used. As the copper alloy wire, for example, a tin-copper alloy wire, copper-nickel alloy wire, and a silver containing copper alloy wire can be used. In the silver containing copper alloy wire, copper solid solution and silver-copper eutectic alloy are in a fiber shape. From the above listed materials, the copper wire and the copper alloy wire are preferred to be used in the viewpoint of a balance between the cost and characteristics. Regarding the copper wire and the copper alloy wire, although both soft and hard materials exist, the hard material is more preferable than the soft material in the viewpoint of bending resistance. Note that the hard copper wire and the hard copper alloy wire are made by stretching individual metal crystal grains long in a machining direction by cold working such as drawing processing to form a fibrous structure. If the above described hard copper wire and hard copper alloy wire are heated at a temperature higher than a recrystallization temperature, processing strains generated in the metal crystal are removed and crystal nuclei begin to appear to serve as a base of new metal crystal. The crystal nuclei are developed, then recrystallization, which is a process of replacing old crystal grains with new metal crystal grains, occurs sequentially, and then the crystal grains are developed. The soft copper wire and the soft copper alloy wire are materials containing such crystal grains in a developed state. The soft copper wire and the soft copper alloy wire have higher stretchability and higher electric resistance but have lower tensile strength compared to the hard copper wire and the hard copper alloy wire. Therefore, the bending resistance of the soft copper wire and the soft copper alloy wire are lower than those of the hard copper wire and the hard copper alloy wire. As explained above, the hard copper wire and the hard copper alloy wire are changed to the soft copper wire and the soft copper alloy wire having lower bending resistance by heat treatment. Therefore, the heat history is preferred to be as less as possible when processing. Note that the hard copper wire is also defined in JIS-C3101 (1994) and the soft copper wire is also defined in JIS-C3102 (1984). In the definition, the soft copper wire is defined to have 15% or more growth in the outer diameter of 0.10 to 0.26 mm, 20% or more growth in the outer diameter of 0.29 to 0.70 mm, 25% or more growth in the outer diameter of 0.80 to 1.8 mm, and 30% or more growth in the outer diameter of 2.0 to 7.0 mm. In addition, the copper wire includes wires to which tin-plating is applied. The tin-plated hard copper wire is defined in JIS-C3151 (1994), and the tin-plated soft copper wire is defined in JIS-C3152 (1984). Furthermore, various shapes can be used as a cross sectional shape of the conductive wires 5a. Without being limited to wires having a circular cross section, although they are ordinary used, so-called a rectangular wire can be also used.

However, when the conductive wires 5a are wound around the core material 3, the material of conductive wires 5a is preferred to be selected from the above described materials of the conductive wires 5a so that an amount of spring-back is suppressed and a recovery rate is 200% or less. For example, if the silver containing copper alloy in which fiber shaped copper solid solution and silver-copper eutectic alloy are included is used, although tensile strength and bending resistance are excellent, spring-back is easily caused when it is wound. Therefore, the silver containing copper alloy is not preferred because the conductive wires 5a is easily floated when the conductive wires 5a is wound around the core material 3 and the conductive wires 5a is easily broken when excessive winding tension force is applied. In addition, winding habit is easily formed after the winding process. In particular, when the insulating film 5b is coated on the conductive wires 5a, the recovery rate of the insulating film 5b is also added. Therefore, it is important that conductive wires 5a having low recovery rate is selected so as to compensate the recovery force of the insulating film 5b.

Here, the measurement of the recovery rate defined in the present invention will be described in detail. At first, while a predetermined load is applied to the conductive wires, the conductive wires are wound three times or more around a cylinder-shaped mandrel having a diameter of 60 times larger than a diameter of the conductive wires so that the conductive wires are not overlapped with each other. After 10 minutes have passed, the load is removed, the conductive wires are removed from the mandrel, an inner diameter of the shape restored by elasticity is measured, and a rate of the spring-back of the conductive wires is calculated by the following formula (I) so that the calculated rate is evaluated as the recovery rate.

$$R=(d2/d1)\times 100 \quad (I)$$

Explanation of symbols:
R: recovery rate (%)
d1: diameter of mandrel used for winding test (mm)
d2: inner diameter of shape restored by releasing load after conductive wires are wound around mandrel (mm)

Regarding the insulating film 5b that is covered on the conductive wires 5a, a polyurethane resin, a polyamide resin, a polyimide resin, a polyamide imide resin, a polyester imide resin, a nylon resin, a polyester-nylon resin, a polyethylene resin, a polyester resin, a vinyl chloride resin, a fluorine resin, and a silicone can be used, for example. However, the materials that contain the silicon are preferable in the above listed materials. The silicone is a collective term of artificial polymeric compounds having a main framework structure formed by a siloxane bond. The silicone takes a form of a silicone resin and a silicone rubber (silicone elastomer), for example. An amount of a methyl group and a phenyl group as a substituent can be arbitrarily adjusted. Other substituents such as an ether group, a fluoroalkyl group, an epoxy group, an amino group, and a carboxyl group can be arbitrarily added. In addition, a mixture of the silicone and other polymeric materials or a copolymer of a polysiloxane and other polymeric components can be used. As an example, a so-called alkyd silicone, which is obtained by mixing the polyester resin and the silicone resin, or a so-called acrylic silicone, which is a graft copolymer of an acrylic polymer and a dimethyl polysiloxane, can be used. An amount of the silicone contained in the insulating film 5b is preferably within a specific range in various specific viewpoints. Note that, when using the copolymer of the silicone and other polymeric components, a weight of only the silicone in the copolymer should be calculated as an amount of the silicone. If the amount of the silicone is insufficient, the insulating film 5b may be removed since the other components are pyrolyzed by the heat generated when the spark occurs. In addition, a bad influence may be given to an appearance. From the above described viewpoints, the content of the silicone is preferably 20% or more by a weight ratio, and can be 40% or more by a weight ratio. If the amount of the silicone is too much, wettability is reduced. This makes it difficult to be applied to the conductive wires 5a. Thus, an appearance may be affected. In addition, because of that, insulation performance of the insulating film 5b can be insufficient. From the above described viewpoints, the content of the silicone is preferably 90% or less by a weight ratio, and can be 80% or less by a weight ratio. In addition, a primer can be preliminary applied to the conductive wires 5a so that adhesion between the conductive wires 5a and the insulating film 5b is improved.

The above described insulating film 5b containing the silicone has excellent heat resistance, incombustibility, and chemical stability. Even if the insulating film 5b is subjected to high heat when the spark is generated, a silicon oxide film is formed and therefore an insulation can be maintained. Furthermore, a siloxane gas is generated by high heat when the spark is generated. Since the silicon oxide film is precipitated from the siloxane gas at an end surface of the conductive wires and the end surface is insulated, the spark can be prevented after that. The silicone as describe above is coated on the conductive wires 5a to be served as the insulating film 5b by applying the silicone on the conductive wires 5a in a state that the silicone is dissolved or dispersed in a solvent, a solvating media such as water, or a dispersion media and then drying it, or by forming the silicon on an outer periphery of the conductive wires 5a using a forming means such as an extrusion molding, for example. The extrusion molding of the silicone can be performed at a relatively constant temperature. However, when applying the silicone dissolved or dispersed in the solvent, the water or other media, the silicon is exposed to a relatively high temperature environment so that drying is finished shortly. As explained above, the conductive wires 5a made of the copper wire and the copper alloy wire changes its characteristics between soft and hard by the heat history. Therefore, considering this point, the method of forming the insulating film 5b should be selected. In addition, when forming the insulating film 5b, a thickness of the insulating film 5b can be thinner when the silicon resin is applied compared to the extrusion molding. As a result, a diameter of the cord-shaped heater can be thinner.

A thickness of the insulating film 5b is preferably 3 to 30% of the diameter of the conductive wires 5a. If the thickness is less than 3%, voltage resistance is insufficient and therefore an individual coating of the conductive wires 5a may become meaningless. If the thickness exceeds 30%, it becomes difficult to remove the insulating film 5b when connection terminals are press-bonded, and the cord-shaped heater becomes unnecessarily thick.

When winding the conductive wires 5a around a core material 3 in a state of being paralleled together or twisted together, the paralleled state is more preferable than the twisted state. This is because the diameter of the cord-shaped heater becomes smaller and a surface becomes smooth. In addition to the paralleled state and the twisted state, the conductive wires 5a can be braided on the core material 3.

In the cord-shaped heater of the present invention, the inner-layer covering 7 is preferably formed on an outer periphery of the conductive wires 5a. If, by any chance, the conductive wires 5a is disconnected, power supply to other members are insulated by the inner-layer covering 7. Furthermore, even when the spark occurs, generated heat of high temperature is insulated. When forming the inner-layer covering 7, the method of forming is not particularly limited. For example, the extrusion molding can be used, and the inner-layer covering 7 can be preliminary formed in a tubular shape to be covered on the conductive wires 5a. If the inner-layer covering 7 is formed by the extrusion molding, a position of the conductive wires 5a is fixed. Since friction and bending caused by positional misalignment of the conductive wires 5a can be prevented, bending resistance is improved. Therefore, the extrusion molding is preferred. Materials forming the inner-layer covering 7 can be arbitrarily specified according to usage pattern and usage environment of the cord-shaped heater. For example, various resins such as a polyolefin-based resin, a polyester-based resin, a polyurethane-based resin, aromatic polyamide-based resin, an aliphatic polyamide-based resin, a vinyl chloride resin, a modified-Noryl resin (polyphenylene oxide resin), a nylon resin, a polystyrene resin, a fluororesin, a synthetic rubber, a fluororubber, an ethylene-based thermoplastic elastomer, an urethane-based thermoplastic elastomer, a styrene-based thermoplastic elastomer, a polyester-based thermoplastic elastomer can be used. In particular, a polymer composition having flame retardancy is preferably used. Here, the polymer composition having flame retardancy means the polymer composition having an oxygen index of 21 or more in the flame retardant test defined in JIS-K7201 (1999). The polymer composition having the oxygen index of 26 or more is especially preferred. In order to obtain the above described flame retardancy, a flame retardant material or other material can be arbitrarily added to the material forming the above described inner-layer covering 7. As for the flame retardant material, metal hydrates of a magnesium hydroxide and an aluminum hydroxide, an antimony oxide, a melamine compound, a phosphorus compound, chlorine-based flame retardant, and a bromine-based flame retardant can be used, for example. A surface treatment can be arbitrarily applied to the above described flame retardant materials by a conventionally known method.

Since the outer-layer covering 9 is formed on the outer periphery of the inner-layer covering 7, the cord-shaped heater 11 can be heat-fused with the substrate 11 by heating and pressing. As for the material for forming the outer-layer covering 9, the same materials as the above described materials forming the inner-layer covering 7 can be used. An olefin-based resin is preferred in the above listed materials because the olefin-based resin is excellent in adhesion to the substrate. Regarding the olefin-based resin, a high density polyethylene, a low density polyethylene, an ultra-low density polyethylene, a linear low density polyethylene, a polypropylene, a polybutene, an ethylene-α-olefin copolymer, and an ethylene-unsaturated ester copolymer can be used, for example. In the above listed materials, the ethylene-unsaturated ester copolymer is especially preferred. The ethylene-unsaturated ester copolymer has a molecular structure containing oxygen in the molecular. Therefore, a heat of combustion is lower compared to the resins such as the polyethylene, which has a molecular structure consisting only of carbon and hydrogen. As a result, the combustion is suppressed. In addition, the ethylene-unsaturated ester copolymer originally has high adhesiveness. Therefore, the ethylene-unsaturated ester copolymer is excellent in adhesion to the substrate, and deterioration of the adhesiveness is low when mixed with inorganic powders or the like. Thus, the ethylene-unsaturated ester copolymer is suitable for mixing with various flame retardant materials. Regarding the ethylene-unsaturated ester copolymer, an ethylene-vinyl acetate copolymer, an ethylene-(meth) acrylic acid methyl copolymer, an ethylene-(meth) acrylic acid ethyl copolymer, and an ethylene-(meth) acrylic acid butyl copolymer can be used, for example. The above listed materials can be used independently or two or more kinds can be mixed. Here, "(meth) acrylic acid" means both acrylic acid and methacrylic acid.

The material can be arbitrarily selected from the above listed materials. However, the material melted at a temperature equal to or lower than a kick-off temperature or a melting temperature of the above described material forming the insulating film 5b is preferred. In addition, regarding the material excellent in adhesion to the substrate 11, a polyester-based thermoplastic elastomer is exemplified. When the polyester-based thermoplastic elastomer is used, the temperature of the melting temperature can be specified in wider range. Regarding the polyester-based thermoplastic elastomer, there are both a polyester-polyester type and a polyester-polyether type. However, the polyester-polyether type is preferred because the adhesiveness is higher. Note that, when the cord-shaped heater 1 and the substrate 11 are heat-fused together, adhesion strength between the cord-shaped heater 1 and the substrate 11 is very important. If the adhesion strength is not enough, the cord-shaped heater 1 is peeled off from the substrate 11 during repeated use. Because of this, unexpected bending is applied to the cord-shaped heater 11. Thus, possibility of the disconnection fault of the conductive wires 5a is increased. If the conductive wires 5a are disconnected, a role of the heater is lost, and also a spark may be generated by chattering.

It is required that the melting temperature of the inner-layer covering 7 is higher than the melting temperature of the outer-layer covering 9. Because of this, even when the outer-layer covering 9 is heat-fused by the heating and pressing, the inner-layer covering 7 is not substantially deformed and enough insulation property can be maintained. The lower limit of the melting temperature of the inner-layer covering 7 can be higher by 30° C. or more than the melting temperature of the outer-layer covering 9, and the upper limit of the melting temperature of the inner-layer covering 7 can be 300° C. The melting temperature of the inner-layer covering 7 is preferably 215° C. to 250° C. If the melting temperature of the inner-layer covering 7 is lower than the above described range, the inner-layer covering 7 may be deformed during the heating and pressing to the substrate. Thus, it is not preferable. If the melting temperature of the inner-layer covering 7 is higher than the above described range, the heater may be damaged during the extrusion molding or the like to the outer periphery of the heater wire. Thus, it is not preferable. The melting temperature of the outer-layer covering 9 can be 100° C. to 225° C. The melting temperature of the outer-layer covering 9 is preferably 130° C. to 185° C. If the melting temperature of the outer-layer covering 9 is lower than the above described range, the outer-layer covering 9 may be melted at the temperature of using the heater and positional misalignment may occur. Thus, it is not preferable. If the melting temperature of the outer-layer covering 9 is higher than the above described range, the substrate may be deteriorated during the hot pressing to the substrate. Thus, it is not preferable.

In addition, when the insulating film 5b is formed on the conductive wires 5a, it is preferred that the melting temperature of the inner-layer covering 7 is lower than the melting temperature of the insulating film 5b. The thickness of the inner-layer covering 7 is preferred to be as thin as possible for reducing the feeling of foreign materials when used as a steering heater or the like. However, the thickness is preferably 0.04 mm or more since sufficient voltage resistance may not be obtained when the thickness is less than 0.04 mm. When the thickness of the inner-layer covering 7 is 0.04 mm, the voltage resistance up to 1000V can be obtained. The thickness of the outer-layer covering 9 is also preferred to be as thin as possible. Even when the outer-layer covering 9 is thin, the influence to the adhesiveness is not large. The total outer diameter of the heater wire including the core material 3, the conductive wires 5a, the inner-layer covering 7 and the outer-layer covering 9 is preferably 0.73 mm or less for reducing the feeling of foreign materials when used as a steering heater or the like.

In addition, it is required that the material forming the inner-layer covering 7 and the material forming the outer-layer covering 9 are made of same type of polymer material. Here, the same type of polymer material includes the polymer materials having the same (common) main chain structure, the polymer materials having the same functional group, the polymer materials which differ from each other only in the molecular weight, the copolymers having the same monomer unit, and the mixtures containing the same polymer material, for example. By using the above described materials, the inner-layer covering 7 and the outer-layer covering 9 are sufficiently adhered with each other. Thus, the cord-shaped heater can be prevented from being separated from the substrate.

Other layers can be arbitrarily formed on the outer periphery of the conductive wires 5a in addition to the inner-layer covering 7 and the outer-layer covering 9. When the layers are three or more, the outermost layer is the outer-layer covering 9 and the layer immediately inside the outermost layer is the inner-layer covering 7. In addition, the inner-layer covering 7 and the outer-layer covering 9 are not necessarily formed continuously in a length direction. For example, the inner-layer covering 7 and the outer-layer covering 9 can be formed linearly or spirally along the length direction of the cord-shaped heater 1, formed in a dot pattern, or formed intermittently. However, the inner-layer covering 7 and the outer-layer covering 9 are preferably formed continuously in a length direction from the viewpoint of the adhesion strength.

When a bending-resistance test, which is performed by repeatedly bending in an angle of 90° with a radius of curvature of 6 times of the self-diameter, is performed for the cord-shaped heater 1 obtained above, the number of bending until the break of at least one of the conductive wires is preferably 20,000 times or more.

The substrate 11 is not limited to foamed polyurethane resin. For example, various polymeric foams such as a foamed resin sheet made of the other materials and a foamed rubber sheet can be used as the substrate 11. The material having gaps and having stretchability are particularly preferred. It is preferred that the hardness is adjusted so that the unevenness of the cord-shaped heater does not appear on the surface. The hardness can be adjusted by adjusting a foaming rate, switching the state of the cells between closed cells and open cells, or using the material having the hardness suitable for the purpose, for example. The material can be arbitrarily selected from various resins, rubbers and thermoplastic elastomers such as a polyurethane resin, a chloroprene rubber, a silicone resin, a silicone rubber, a neoprene rubber, a diene rubber, a nitrile rubber, a natural rubber, a polyethylene resin, a polypropylene resin, and an ethylene-vinyl acetate copolymer.

In addition, cloth materials such as a nonwoven fabric, a woven fabric and a knit fabric can be also used as the substrate 11. When the cloth materials are used, the kind of the fiber to be used can be arbitrarily selected from various kinds of fibers. However, it is preferred to add a heat-fusing fiber or the fiber made of the same type of material as the outer-layer covering 9 of the cord-shaped heater 1 for increasing the adhesiveness between the cord-shaped heater 1 and the substrate 11. In particular, the nonwoven fabric is especially preferred to be used for the car sheet heater because the nonwoven fabric has a good touch feeling and is soft. The fiber having the core-sheath structure is used as the heat-fusing fiber where the low-melting polyester is used as the sheath component. Other than this, a low-melting polypropylene or a polyethylene can be used as the sheath component in the core-sheath structure of the fiber, for example. By using the above described heat-fusing fiber, a sheath portion of the heat-fusing fiber and the outer-layer covering 9 are fused together and integrated in a state of surrounding a core portion of the heat-fusing fiber. Thus, the adhesion between the cord-shaped heater 1 and the nonwoven fabric becomes very strong. Regarding the flame retardant fiber, in addition to the above described flame retardant polyester, various flame retardant fibers can be used. Here, the flame retardant fiber means the fiber satisfying the requirements JIS-L1091 (1999). By using the above described flame retardant fiber, an excellent flame retardancy is applied to the substrate.

A mixture ratio of the heat-fusing fiber is preferably 5% or more and 20% or less. If the mixture ratio of the heat-fusing fiber is less than 5%, the adhesiveness is insufficient. If the mixture ratio of the heat-fusing fiber exceeds 20%, the nonwoven fiber becomes hard. That causes a feeling of strangeness to a seated person, and reduces the adhesiveness to the cord-shaped heater instead. Furthermore, the substrate is shrunk by the heat of the heat-fusion, and dimensions intended in the product design may not be obtained. The mixture ratio of the flame retardant fiber is 70% or more, and is preferably 70% or more and 95% or less. If the mixture ratio of the flame retardant fiber is less than 70%, the flame retardancy is insufficient. If the mixture ratio of the flame retardant fiber exceeds 95%, the mixture ratio of the heat-fusing fiber is relatively insufficient and the adhesiveness is insufficient. Note that a sum of the mixture ratio of the heat-fusing fiber and the mixture ratio of the flame retardant fiber is not necessarily 100%. Other fibers can be arbitrarily mixed. Even if the heat-fusing fiber is not mixed, sufficient adhesiveness can be obtained by, for example, using similar types of materials both for the material of the heat-fused portion and the material of the fiber forming the substrate. Therefore, it can be reasonably assumed that the heat-fusing fiber is not mixed.

A size, a thickness and other conditions of the nonwoven fabric are arbitrarily changed according to the usage. However, the thickness (a value measured in a dried condition) is preferably approximately 0.6 mm to 1.4 mm. By using the nonwoven fabric having the above described thickness, when the cord-shaped heater and the nonwoven fabric are adhered and fixed with each other by heating and pressing, the nonwoven fabric adheres with 30% or more, preferably 50% or more, of the outer periphery of the cord-shaped heater. Thus, the adhesion can be strong.

In addition, a plurality of substrates 11 can be used. The plurality of substrates 11 can be laminated in a multilayer state. In this case, the materials forming the plurality of substrate 11 can be different from each other. Because of this, the unevenness of the cord-shaped heater hardly appears on the surface. In addition, when the adhesive layer is formed so that the adhesive material does not enter into the gaps (e.g., cells) inside the substrate 11, the substrate 11 is not hardened, stretchability is not deteriorated, and touch feeling is not deteriorated. Thus, it is preferable.

In particular, it is preferred that more gaps are provided in a surface (hereafter, referred to as an arrangement surface) on which the cord-shaped heater 1 is arranged than another surface (hereafter, referred to as a non-arrangement surface) on which the cord-shaped heater 1 is not arranged. For example, in cloth materials such as a woven fabric and a nonwoven fabric, a state of having many gaps means a state of having a small unit weight, i.e. fiber weight per unit volume. In porous bodies such as a foamed resin sheet and a foamed rubber sheet, a state of having many gaps means a state of having a large porosity. For example, woven fabric or a nonwoven fabric formed by carrying out calendar processing on one side or both sides so that different strength are applied on each side by adjusting a temperature and a pressure, a nonwoven fabric formed by carrying out needle punching only from one side, a cloth body on which piles or raising are formed on one side, a foamed resin sheet or a foamed rubber sheet formed so that a porosity is gradually changed in a thickness direction, or materials formed by sticking materials having different porosities together can be used. In particular, the pores of the substrate 11 are preferably continued. This is because the melted heat fusion layer penetrates in the continued pores. Thus, anchor effect is increased and adhesive strength is improved. Regarding the state of continuing the pores, cloth bodies, i.e. fiber aggregate, such as a woven fabric and a nonwoven fabric, and a foamed resin sheet or a foamed rubber sheet having continuous pores can be considered. When the substrate 11 having the pores is used, it is enough for forming the pores within the range into which the outer-layer covering 9 of the cord-shaped heater 1 enters. The materials not having pores can be also used, for example.

When the cord-shaped heater 1 is arranged on the substrate 11, in addition to the embodiment of adhering and fixing by the fusion of heating and pressing, the cord-shaped heater 1 can be fixed on the substrate 11 by using other embodiments. For example, in order to set the temperature to be higher than the temperature of the normal usage, an embodiment of adhering and fixing the cord-shaped heater 1 with the substrate 11 by melting the outer-layer covering 9 using heat generated by energizing the cord-shaped heater 1, an embodiment of adhering and fixing the cord-shaped heater 1 with the substrate 11 by melting the conductive wires 5 by the heat generated by induction heating, an embodiment of adhering and fixing the cord-shaped heater 1 with the substrate 11 by melting the outer-layer covering 9 made of heat-fusing material using hot air, and an embodiment of sandwiching and fixing the cord-shaped heater 1 by a pair of substrates 11 while heating can be used. In addition, when heating and pressing the substrate 11, the hot pressing jig 15 can be also heated in addition to the press hot plate 27. At that time, the temperature of the press hot plate 27 can be made different from the temperature of the hot pressing jig 15 so that the compression ratios (i.e., porosities) of the substrate 11 are made different.

For the adhesive layer, various materials can used. For example, an adhesive layer formed of acrylic polymer adhesive material not using the tape substrate and an adhesive layer formed by forming adhesive material on both surfaces of a polypropylene film can be used. The adhesive layer preferably has flame retardancy satisfying the requirements of the combustion test of the automobile interior material of FMVSS No. 302 when the adhesive layer is independently used. Thus, flame retardancy of the sheet-shaped heater is improved. In addition, the adhesive layer is preferably made only of the adhesive material not to deteriorate the stretchability of the sheet-shaped heater.

Figure 11:
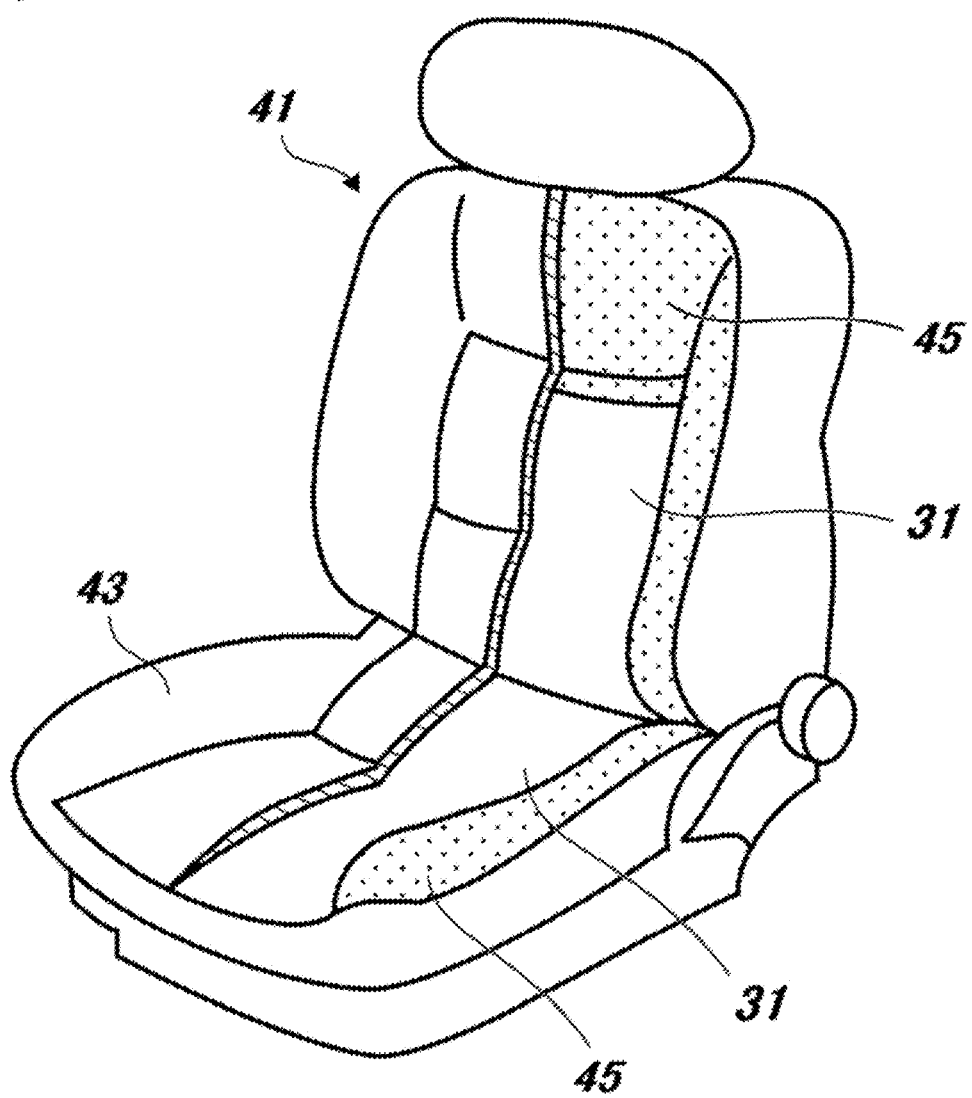
FIG. 11 is a partially cutaway perspective view showing a state that the sheet-shaped heater of the present invention is embedded in a vehicle sheet.

When the sheet-shaped heater 31 of the present invention is applied to a vehicle sheet heater, the sheet-shaped heater 31 is embedded and arranged in a vehicle sheet 41 in a state shown in FIG. 11. Namely, the sheet-shaped heater 31 is stuck to a skin cover 43 or a seat pad 45 of the vehicle sheet 41.

INDUSTRIAL APPLICABILITY

As explained above in detail, the present invention provides the cord-shaped heater having high adhesiveness and enough insulation property. The cord-shaped heater can be used as the sheet-shaped heater, for example by being arranged on the substrate such as a polymeric foam and a nonwoven fabric in a predetermined shape such as a meandering shape. The sheet-shaped heater can be suitably used for an electric blanket, an electric carpet, a car sheet heater, a steering heater, a heated toilet seat, an anti-fog mirror heater, and a heating cooker, for example. In addition, as the single use of the cord-shaped heater, the cord-shaped heater can be wound and adhered around a pipe, a tank or the like, or can be installed inside the pipe, for example. Regarding the practical use, the cord-shaped heater can be suitably used as an antifreezing heater for a piping and a pipe drain of a freezer, a heat retaining heater for an air conditioner and a dehumidifier, a defrosting heater for a refrigerator and a freezer, a drying heater and a floor heating heater, for example. The cord-shaped heater of the present invention can be directly adhered to or directly wound around the heating objects in the above listed examples of the usage of the sheet-shaped heater: the electric blanket, the electric carpet, the car sheet heater, the steering heater, the heated toilet seat, the anti-fog mirror heater, the heating cooker, and the floor heating heater.

DESCRIPTION OF THE REFERENCE NUMERALS

1: cord-shaped heater
3: core material
5a: conductive wire
5b: insulating film
7: inner-layer covering
9: outer-layer covering
11: substrate
31: sheet-shaped heater

The invention claimed is:

1. A cord-shaped heater, comprising:
   a conductive wire;
   an inner-layer covering formed on the outer periphery of the conductive wire; and
   an outer-layer covering formed on the outer periphery of the inner-layer covering, characterized in that
   the melting temperature of the inner-layer covering is higher than the melting temperature of the outer-layer covering,
   the inner-layer covering is selected from the group consisting of a polyester resin, a polyolefin-based thermoplastic elastomer, a polyester-based thermoplastic elastomer and a polyurethane-based thermoplastic elastomer,
   the outer-layer covering is a same material as the inner-layer covering, and
   the inner-layer covering and the outer-layer covering are adhered to each other.

2. The cord-shaped heater according to claim 1, characterized in that
   the conductive wire includes a plurality of conductive wires, and
   the conductive wire is covered with an insulating film.

3. The cord-shaped heater according to claim 1, characterized in that
the polymer material is the polyester-based thermoplastic elastomer.

4. The cord-shaped heater according to claim 1, characterized in that
the melting temperature of the outer-layer covering is 100° C. to 225° C.,
a lower limit of the melting temperature of the inner-layer covering is higher by 30° C. or more than the melting temperature of the outer-layer covering, and
an upper limit of the melting temperature of the inner-layer covering is 300° C.

5. The cord-shaped heater according to claim 1, characterized in that
the melting temperature of the outer-layer covering is 130° C. to 185° C., and
the melting temperature of the inner-layer covering is 215° C. to 250° C.

6. The cord-shaped heater according to claim 1, characterized in that
a thickness of the inner-layer covering is 0.04 mm or more, and
an outer diameter of the cord-shaped heater is 0.73 mm or less.

7. A sheet-shaped heater, characterized in that
the cord-shaped heater according to claim 1 is arranged on a substrate.

8. The sheet-shaped heater according to claim 7, characterized in that
the substrate has a gap,
at least a part of the outer-layer covering is penetrated into the gap of the substrate, and
the inner-layer covering is not penetrated into the gap of the substrate.

9. The sheet-shaped heater according to claim 8, characterized in that
a cross-sectional shape of the inner-layer covering is kept in an approximately circular shape.

10. The sheet-shaped heater according to claim 7, characterized in that
the polymer material is the polyester-based thermoplastic elastomer.

11. The sheet-shaped heater according to claim 7, characterized in that
the melting temperature of the outer-layer covering is 100° C. to 225° C.,
a lower limit of the melting temperature of the inner-layer covering is higher by 30° C. or more than the melting temperature of the outer-layer covering, and
an upper limit of the melting temperature of the inner-layer covering is 300° C.

12. The sheet-shaped heater according to claim 7, characterized in that
the melting temperature of the outer-layer covering is 130° C. to 185° C., and
the melting temperature of the inner-layer covering is 215° C. to 250° C.

13. The sheet-shaped heater according to claim 7, characterized in that
a thickness of the inner-layer covering is 0.04 mm or more, and
an outer diameter of the cord-shaped heater is 0.73 mm or less.

14. A method of manufacturing sheet-shaped heater, the method comprising the steps of:
arranging a cord-shaped heater on a substrate having a gap, the cord-shaped heater including a conductive wire, an inner-layer covering formed on the outer periphery of the conductive wire, and an outer-layer covering formed on the outer periphery of the inner-layer covering, wherein the inner-layer covering is selected from the group consisting of a polyester resin, a polyolefin-based thermoplastic elastomer, a polyester-based thermoplastic elastomer and a polyurethane-based thermoplastic elastomer, and the outer-layer covering is a same material as the inner-layer covering; and
heat-fusing the cord-shaped heater and the substrate by melting the outer-layer covering by heat and pressure without substantially melting the inner-layer covering so that the outer-layer covering is penetrated into the gap of the substrate.

* * * * *